(12) United States Patent
Fisher

(10) Patent No.: US 9,969,210 B1
(45) Date of Patent: May 15, 2018

(54) WHEEL LOCK DEVICE

(71) Applicant: GM GLOBAL TECHNOLOGY OPERATIONS LLC, Detroit, MI (US)

(72) Inventor: Chad P. Fisher, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/348,297

(22) Filed: Nov. 10, 2016

(51) Int. Cl.
*B60B 7/16* (2006.01)
*B60B 7/00* (2006.01)
*B60B 7/08* (2006.01)

(52) U.S. Cl.
CPC .............. *B60B 7/16* (2013.01); *B60B 7/0013* (2013.01); *B60B 7/08* (2013.01)

(58) Field of Classification Search
CPC B60B 7/16; B60B 7/0013; B60B 7/08; B60B 7/0066; B60B 7/0073
USPC ...................................................... 301/37.21
See application file for complete search history.

(56) References Cited

U.S. PATENT DOCUMENTS

| | | | | |
|---|---|---|---|---|
| 2,659,229 A | * | 11/1953 | Skillman | B60B 7/16 301/108.1 |
| 4,458,952 A | * | 7/1984 | Foster | B60B 7/068 301/37.32 |
| 5,595,422 A | * | 1/1997 | Ladouceur | B60B 7/16 301/37.21 |
| 9,718,304 B2 | * | 8/2017 | Perez Rojo | B60B 7/066 |
| 2008/0127691 A1 | * | 6/2008 | Castillo | B60B 7/16 70/225 |

FOREIGN PATENT DOCUMENTS

| | | | | |
|---|---|---|---|---|
| DE | 3233918 A1 | * | 3/1984 | B60B 7/16 |
| GB | 2050963 A | * | 1/1981 | B60B 7/16 |

* cited by examiner

*Primary Examiner* — Kip T Kotter

(57) ABSTRACT

A locking device for a vehicle wheel is disclosed. In some embodiments, the locking device includes a plate having an outer surface and an inner surface and at least one opening extending through the plate, at least one enclosure extending from the inner surface of the plate, at least one retention tab extending from the inner surface of the plate, the retention tab having a lateral locating portion and a radial locating portion having a slot, and at least one lock cylinder extending through the at least one opening, a lock tab connected to the at least one lock cylinder and movable from an unlocked position to a locked position.

13 Claims, 2 Drawing Sheets

WHEEL LOCK DEVICE

INTRODUCTION

The present invention relates generally to the field of vehicles and, more specifically, to a wheel lock device to prevent theft of vehicle wheels.

Vehicle wheel theft is a prevalent issue. To address this issue, a set of wheel locks may be installed in place of the wheel lug nuts. The set of wheel locks can be removed with a special key that accompanies the set. However, installing one or more wheel locks in place of one or more of the lug nuts is time consuming and the lug nuts remain accessible to thieves.

SUMMARY

Embodiments according to the present disclosure provide a number of advantages. For example, embodiments according to the present disclosure prevent theft of vehicle wheels by blocking access to the lug nuts. Embodiments according to the present disclosure may be used with exposed lug nut style wheels without changing the character of the wheel design. Additionally, embodiments according to the present disclosure may be used in conjunction with locking lug nuts for additional security.

In one aspect, a locking device for a wheel includes a plate having an outer surface and an inner surface and at least one opening extending through the plate, at least one enclosure extending from the inner surface of the plate, at least one retention tab extending from the inner surface of the plate, the retention tab having a lateral locating portion and a radial locating portion having a slot, and at least one lock cylinder extending through the at least one opening, a lock tab connected to the at least one lock cylinder and movable from an unlocked position to a locked position.

In some aspects, the lock tab engages an inboard surface of the wheel when the lock tab is in the locked position. In some aspects, the lock tab engages with the slot of the radial locating portion of the retention tab when the lock tab is in the locked position. In some aspects, the plate is configured to cover at least one lug nut of the wheel. In some aspects, the at least one enclosure is configured to cover at least one lug nut of the wheel.

In some aspects, the lateral locating portion includes a lateral locating edge separating the lateral locating portion from the radial locating portion of the retention tab. In some aspects, the lateral locating portion has a first radius and the radial locating portion has a second radius smaller than the first radius. In some aspects, the at least one enclosure is defined by a sidewall and an endwall and the endwall is a portion of the inner surface of the plate.

In another aspect, a vehicle wheel includes a wheel plate having an outboard surface and an inboard surface, a retention opening extending through the wheel plate, and at least one lug nut opening extending through the wheel plate, at least one lug nut extending through the at least one lug nut opening, and a wheel lock device, the wheel lock device including a lockable plate having an inner surface and an outer surface, at least one lock cylinder opening extending through the lockable plate, at least one enclosure extending from the inner surface of the lockable plate, at least one retention tab extending from the inner surface of the lockable plate, the at least one retention tab having a lateral locating portion and an radial locating portion having a slot, wherein the at least one retention tab extends through the retention opening such that the lateral locating portion is adjacent to the outboard surface of the wheel plate and the at least one enclosure surrounds the at least one lug nut.

In some aspects, the wheel lock device includes at least three retention tabs extending from the inner surface of the lockable plate. In some aspects, the wheel lock device further includes at least one lock cylinder extending through the at least one lock cylinder opening and a lock connected to the at least one lock cylinder and movable from an unlocked position to a locked position. In some aspects, the lock engages the slot of the radial locating portion of the at least one retention tab and engages an inboard surface of the wheel plate.

In yet another aspect, a locking device for a wheel includes a plate having an outer surface, an inner surface, and a central area centered on a center axis of the plate, at least one enclosure extending from the inner surface of the plate adjacent to an outer periphery of the plate, and at least one retention tab extending from the inner surface of the plate adjacent a periphery of the central area, the at least one retention tab having a lateral locating portion and a radial locating portion having a slot.

In some aspects, the locking device further includes at least one lock cylinder opening extending through the plate and at least one lock cylinder extending through the at least one lock cylinder opening and a lock connected to the at least one lock cylinder and movable from an unlocked position to a locked position. In some aspects, the locking device includes at least three retention tabs extending from the inner surface of the plate.

BRIEF DESCRIPTION OF THE DRAWINGS

The present disclosure will be described in conjunction with the following figures, wherein like numerals denote like elements.

Figure 2:
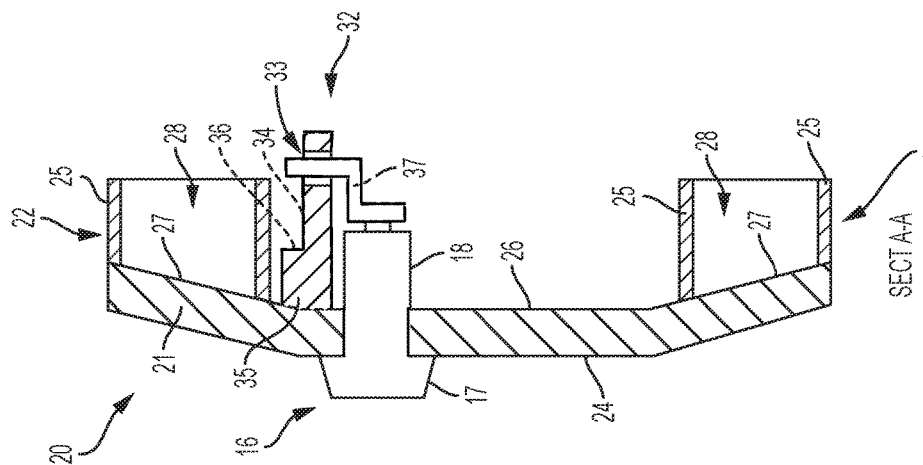
FIG. 2 is a schematic cross-sectional view of the wheel lock device of FIG. 1.

The foregoing and other features of the present disclosure will become more fully apparent from the foil owing description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import. Throughout the following description, like reference numerals refer to like components.

Many production vehicle wheels include a center or button cap to aesthetically cover the wheel bearing and, in some embodiments, the lug nuts of the wheel. Generally, a center cap extends radially out and over the lug nuts and a button cap does not extend radially beyond the lug nuts. The center cap is typically attached via a plurality of tabs that extend from the outer edge center cap towards the wheel and fit into a wheel cap retention hole or opening in the wheel plate of the wheel. The tabs interlock with a portion of the wheel to secure the center cap to the wheel. The center cap can be easily removed to provide access to the wheel bearing or to the lug nuts.

Exemplary embodiments discussed below replace the center or button cap with a wheel lock device that is configured to cover and surround the exposed lug nuts of the wheel without changing the character of the wheel design. The wheel lock device attaches to the wheel with one or more tabs that extend into the existing wheel cap retention hole typically used to retain the center or button cap. In some embodiments, three (3) tabs are used to radially locate the wheel lock device. The wheel lock device locks into place on the wheel plate using one or more keyed locks to prevent direct access to the lug nuts.

Figure 1:
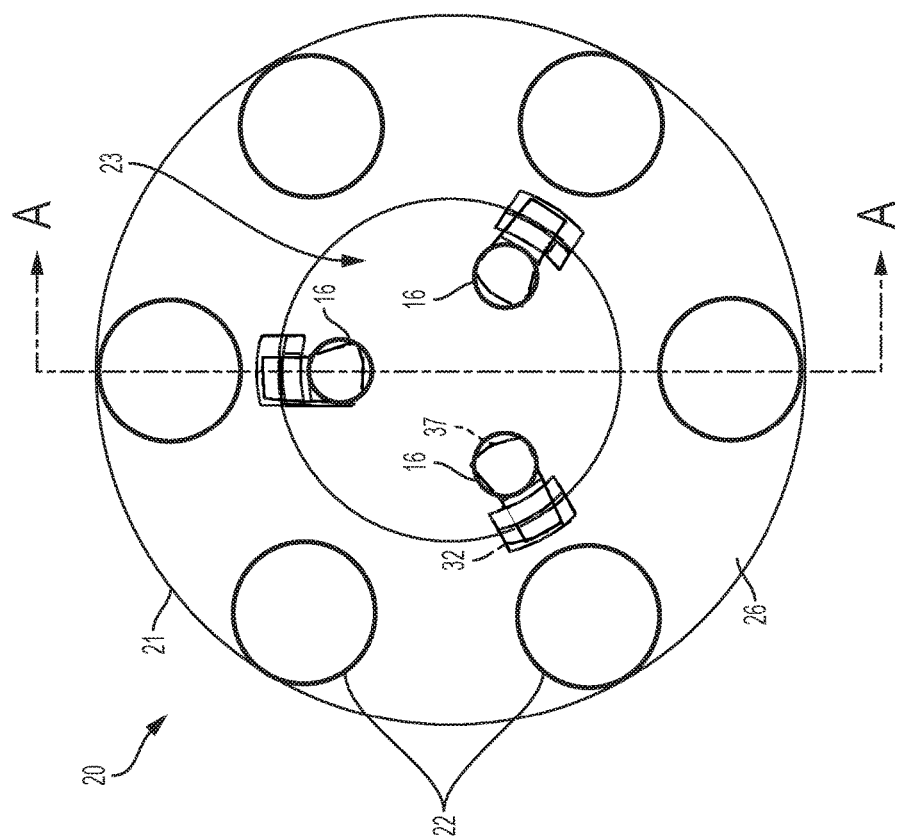
FIG. 1 is a schematic bottom or underside view of a wheel lock device, according to an embodiment.

With reference to FIGS. 1 and 2, an embodiment of a wheel lock device 20 is illustrated. FIG. 1 illustrates an underside or bottom view of the wheel lock device 20 according to an embodiment. FIG. 2 illustrates a cross-sectional view of the wheel lock device 20. The wheel lock device 20 includes a lockable plate 21 having a top or outer surface 24 and a bottom or inner surface 26. The wheel lock device 20 includes a plurality of lug nut enclosures 22 extending from the bottom surface 26 of the lockable plate 21. When installed on a vehicle wheel, the lug nut enclosures 22 of the wheel lock device 20 are configured to cover and encase the lug nuts of the vehicle wheel. As shown in FIG. 2, the lug nut enclosures 22 include a recess 28 defined by an annular sidewall 25 and an endwall 27. The endwall 27 is a portion of the bottom surface 26 of the lockable plate 21. The sidewall 25 is configured to encircle the lug nut such that the lug nut is enclosed within the recess 28 when the wheel lock device 20 is installed.

In the embodiment shown in FIG. 1, six (6) lug nut enclosures 22 are shown, spaced around the outer perimeter of the lockable plate 21. In some embodiments, the lockable plate 21 and enclosures 22 are sized to cover all of the lug nuts of the vehicle wheel. In some embodiments, the number of lug nut enclosures 22 of the wheel lock device 20 equals the number of lug nuts of the vehicle wheel. In some embodiments, the number of lug nut enclosures 22 is less than the number of lug nuts of the vehicle wheel such that one or more of the lug nuts are not enclosed by the enclosures 22 while one or more of the lug nuts are enclosed by the enclosures 22. A different number of lug nut enclosures 22 (such as four, five, six, etc., for example and without limitation) may be included in the wheel lock device 20 depending on the number of lug nuts of the wheel for which the device 20 is intended. The lug nut enclosures 22 prevent access to the lug nuts from the front or outside surface of the lug nuts and from the side of the lug nuts. The lug nut enclosures 22 also prevent clockwise or counterclockwise rotation of the wheel lock device 20 during vehicle operation. Additionally, the lug nut enclosures 22 prevent clockwise or counterclockwise rotation of the wheel lock device 20 by hand, such as if a potential thief were to try and rotate the wheel lock device 20 in an attempt to defeat and/or remove the wheel lock device 20. Without enclosures 22, rotation of the wheel lock device 20 on the wheel could damage the wheel or the locking mechanism of the device 20.

As discussed above, the wheel lock device 20 replaces the center or button cap to prevent access to the lug nuts of the wheel. The wheel lock device 20 includes a circular area 23 centered on a center axis 102 of the lockable plate 21 (see FIG. 3) that is similar in area to the area covered by the center cap or button cap (when installed). One or more retention tabs 32 extend from the underside of the lockable plate 21 at or adjacent to the periphery of the area 23 and engage with the wheel cap retention hole in the wheel plate configured to receive the retention tabs of the center or button cap. As shown in FIG. 1, three (3) tabs 32 extend from the bottom surface 26 of the lockable plate 21. In some embodiments, three (3) tabs 32 are used to properly locate or position the device radially. In some embodiments, 2, 3, 4, 5, 6, or more tabs 32 may extend from the bottom surface 26 of the lockable plate 21. Each of the tabs 32 includes a radial locating portion 34 and a lateral locating portion 35. The radial locating portion 34 is configured to pass through the center or button cap retention hole in the wheel. In some embodiments, the lateral locating portion 35 has a larger radius than a radius of the radial locating portion 34. The lateral locating portion 35 includes a lateral locating edge 36. The lateral locating edge 36 separates the lateral locating portion 35 from the radial locating portion 34. The lateral locating edge 36 is configured to act similar to a shelf and rest against an outside surface of the wheel plate to assist with positioning the wheel lock device 20 for proper engagement of a locking mechanism and lock tabs, as discussed in greater detail below. In some embodiments, the lateral locating edge 36 is lined with a non-marring material to prevent damage to the wheel. The non-marring material includes, for example and without limitation, a polymer coating, rubber, or other non-marring material. The small clearance of the retention tabs 32 to the wheel cap retention hole prevents excess fore/aft and/or vertical movement of the wheel lock device 20. Additionally, the small clearance of the retention tabs 32 to the wheel cap retention hole helps to locate or position the wheel lock device 20.

The wheel lock device 20 also includes a locking mechanism 16 that extends through an opening in the lockable plate 21. In some embodiments, the locking mechanism 16 is a cylindrical locking mechanism configured to be locked and unlocked with a key. The locking mechanism 16 includes a head portion 17 that extends outward from the outer surface 24 of the lockable plate 21 and a cylindrical portion 18 that extends through the plate 21 and past the inner surface 26 of the lockable plate 21. A lock 37 is connected to the cylindrical portion 18. In some embodiments, the lock 37 is a Z-shaped tab that, when in the locked position, engages with an inboard surface of the wheel plate adjacent to the center/button cap retention hole in the wheel plate. The lock 37 also engages with a slot 33 on the elongated radial locating portion 34 of the tab 32. Engagement of the lock 37 in the slot 33 strengthens the lock 37 and limits movement of the lock 37 relative to the retention tab 32.

Rotation of a key in the locking mechanism 16 rotates the lock 37 along an axis 104 (see FIG. 3) defined by the axis of rotation of the cylindrical portion 18 from a locked position, wherein the lock 37 engages with the slot 33, and an unlocked position, wherein the lock 37 is not engaged with the slot 33. When the lock 37 is in the unlocked position, the wheel lock device 20 is removable from the wheel, allowing access to the lug nuts. When the lock 37 is in the locked position, the lock 37 extends radially to a diameter larger than the smallest diameter of the wheel cap retention hole in the wheel plate, and therefore cannot pass through the wheel cap retention hole in the wheel, securing the wheel lock device 20 in place and preventing access to the lug nuts. In some embodiments, the locking mechanism 16 is a lock cylinder that is lockable with a non-standard, pick-resistant key.

Figure 3:
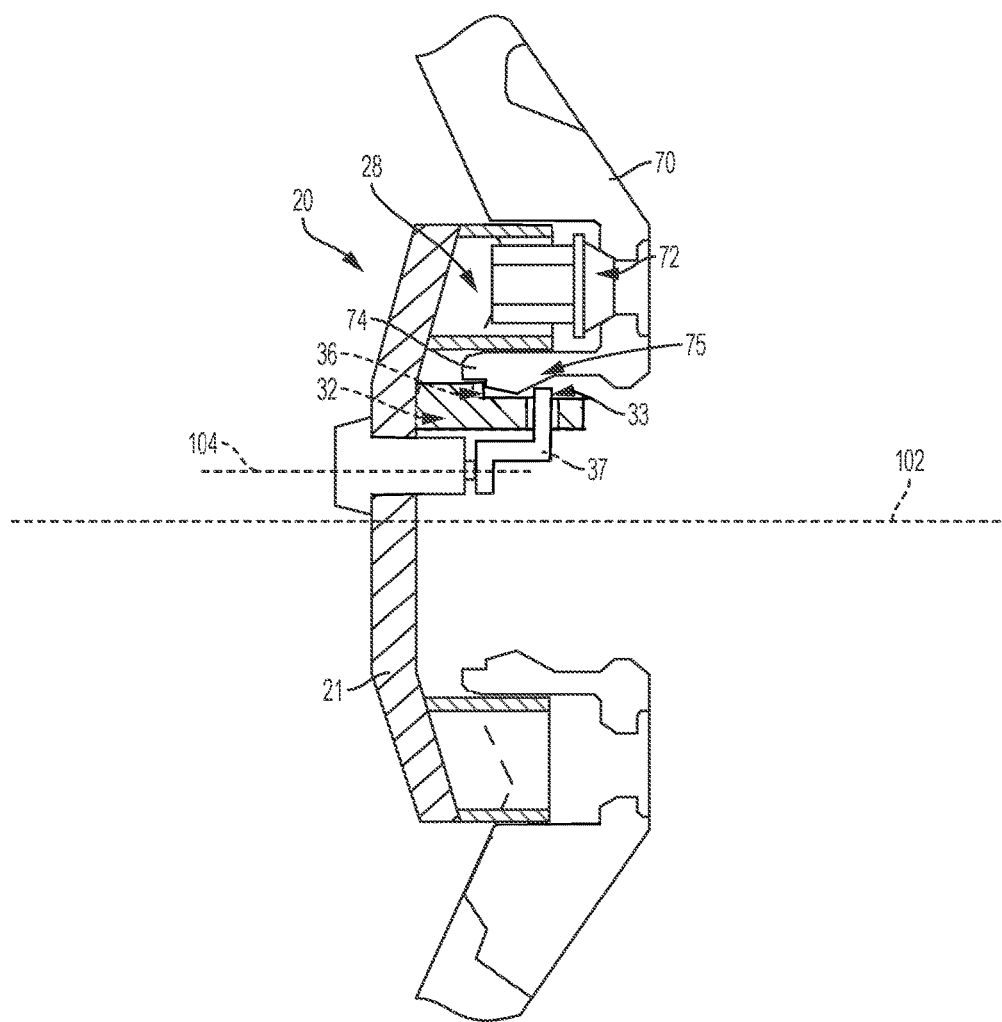
FIG. 3 is a schematic cross-sectional view of the wheel lock device of FIG. 1 installed on a wheel.

FIG. 3 is a cross-sectional view of the wheel lock device 20 of FIGS. 1 and 2 installed on a wheel plate 70 of a vehicle wheel having a removable button cap. The wheel plate 70 includes individual recesses, often called lug pockets, for the attachment of one or more lug nuts 72. To prevent access to the lug nut 72, the lug nut 72 fits within the recess 28 of the wheel lock device 20 and the lockable plate 21 covers the outboard or outer facing surface of the lug nut 72 and a center wheel bearing area of the wheel plate 70. When moved to the locked position through rotation of a key in the locking mechanism 16, the lock 37 fits within the slot 33 of the tab 32. The lateral locating edge 36 seats against the wheel plate surface 74 to locate the wheel lock device 20 on the wheel plate 70. The lock 37 engages with an inboard surface 75 of the wheel plate 70 adjacent to the center/button cap retention hole in the wheel plate 70 to secure the wheel lock device 20 to the wheel.

In some embodiments, the lug nuts 72 of the vehicle are replaced with locking lug nuts of a standard type. Use of locking lug nuts with the wheel lock device 20 further increases the protection against possible theft of the vehicle wheels. In some embodiments, the wheel lock device 20 is used as a temporary theft prevention measure during vehicle transport, such as between the assembly plant and the point of sale. The wheel lock device 20 is easily installed by replacing the wheel center cap or button cap with the wheel lock device 20 and locking the device to the vehicle wheel using a simple, keyed lock. When installed, the wheel lock device 20 does not contact the ground or any other part of the vehicle, allowing the wheels of the vehicle to rotate during normal operation, towing, etc.

In some embodiments the wheel lock device 20 is made from a durable and rigid material such as a metal or metal alloy. In some embodiments, for example and without limitation, the wheel lock device 20 is made from high strength steel or aircraft grade aluminum (T6-6061). In some embodiments, the lug nut enclosures 22 and the retention tabs 32 are welded to the underside 26 of the plate 21. In some embodiments, the plate 21, lug nut enclosures, and the retention tabs 32 are formed as a single piece from a mold or casting. In some embodiments, one or more components of the wheel lock device 20, for example and without limitation, the retention tabs 32 and the lug nut enclosures 22, are lined with a non-marring material, such as, for example and without limitation, a polymer coating or rubber, to prevent damage to the wheel and/or the lug nuts.

The embodiments discussed herein may be used to prevent access to the lug nuts of a vehicle wheel as installed on a vehicle. The embodiments discussed herein may also be used with wheel mounted on spare tire racks to reduce or prevent theft of spare tires mounted on a vehicle.

It should be emphasized that many variations and modifications may be made to the herein-described embodiments the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context dearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including fix example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one a the listed alternatives at a time, unless the context dearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A locking device for a wheel, comprising:
    a plate having an outer surface and an inner surface and at least one opening extending through the plate;
    at least one enclosure extending from the inner surface of the plate;
    at least one retention tab extending from the inner surface of the plate, the retention tab having a lateral locating portion and a radial locating portion having a slot; and
    at least one lock cylinder extending through the at least one opening, a lock tab connected to the at least one lock cylinder and movable from an unlocked position to a locked position.

2. The locking device of claim 1, wherein the lock tab engages an inboard surface of the wheel when the lock tab is in the locked position.

3. The locking device of claim 1, wherein the lock tab engages with the slot of the radial locating portion of the retention tab when the lock tab is in the locked position.

4. The locking device of claim 1, wherein the plate is configured to cover at least one lug nut of the wheel.

5. The locking device of claim 1, wherein the at least one enclosure is configured to cover at least one lug nut of the wheel.

6. The locking device of claim 1, wherein the lateral locating portion includes a lateral locating edge separating the lateral locating portion from the radial locating portion of the retention tab.

7. The locking device of claim 1, wherein the lateral locating portion has a first radius and the radial locating portion has a second radius smaller than the first radius.

8. The locking device of claim 1, wherein the at least one enclosure is defined by a sidewall and an endwall and the endwall is a portion of the inner surface of the plate.

9. A vehicle wheel, comprising:
    a wheel plate having an outboard surface and an inboard surface, a retention opening extending through the wheel plate, and at least one lug nut opening extending through the wheel plate;
    at least one lug nut extending through the at least one lug nut opening;
    a wheel lock device, the wheel lock device comprising a lockable plate having an inner surface and an outer surface, at least one lock cylinder opening extending through the lockable plate, at least one enclosure extending from the inner surface of the lockable plate, at least one retention tab extending from the inner surface of the lockable plate, the at least one retention tab having a lateral locating portion and a radial locating portion having a slot;
    at least one lock cylinder extending through the at least one lock cylinder opening; and
    a lock connected to the at least one lock cylinder and movable from an unlocked position to a locked position;
    wherein the at least one retention tab extends through the retention opening such that the lateral locating portion is adjacent to the outboard surface of the wheel plate and the at least one enclosure surrounds the at least one lug nut.

10. The vehicle wheel of claim 9, wherein the wheel lock device comprises at least three retention tabs extending from the inner surface of the lockable plate.

11. The vehicle wheel of claim 9, wherein the lock engages the slot of the radial locating portion of the at least one retention tab and engages an inboard surface of the wheel plate when the lock is in the locked position.

12. A locking device for a wheel, comprising:
    a plate having an outer surface, an inner surface, and a central area centered on a center axis of the plate;
    at least one enclosure extending from the inner surface of the plate adjacent to an outer periphery of the plate;
    at least one lock cylinder opening extending through the plate;
    at least one lock cylinder extending through the at least one lock cylinder opening;
    a lock connected to the at least one lock cylinder and movable from an unlocked position to a locked position; and at least one retention tab extending from the inner surface of the plate adjacent a periphery of the central area, the at least one retention tab having a lateral locating portion and a radial locating portion having a slot.

13. The locking device of claim 12, wherein the locking device comprises at least three retention tabs extending from the inner surface of the plate.

* * * * *